(No Model.) 3 Sheets—Sheet 1.
C. J. FENDEL.
GRAIN DRILL.
No. 401,022. Patented Apr. 9, 1889.
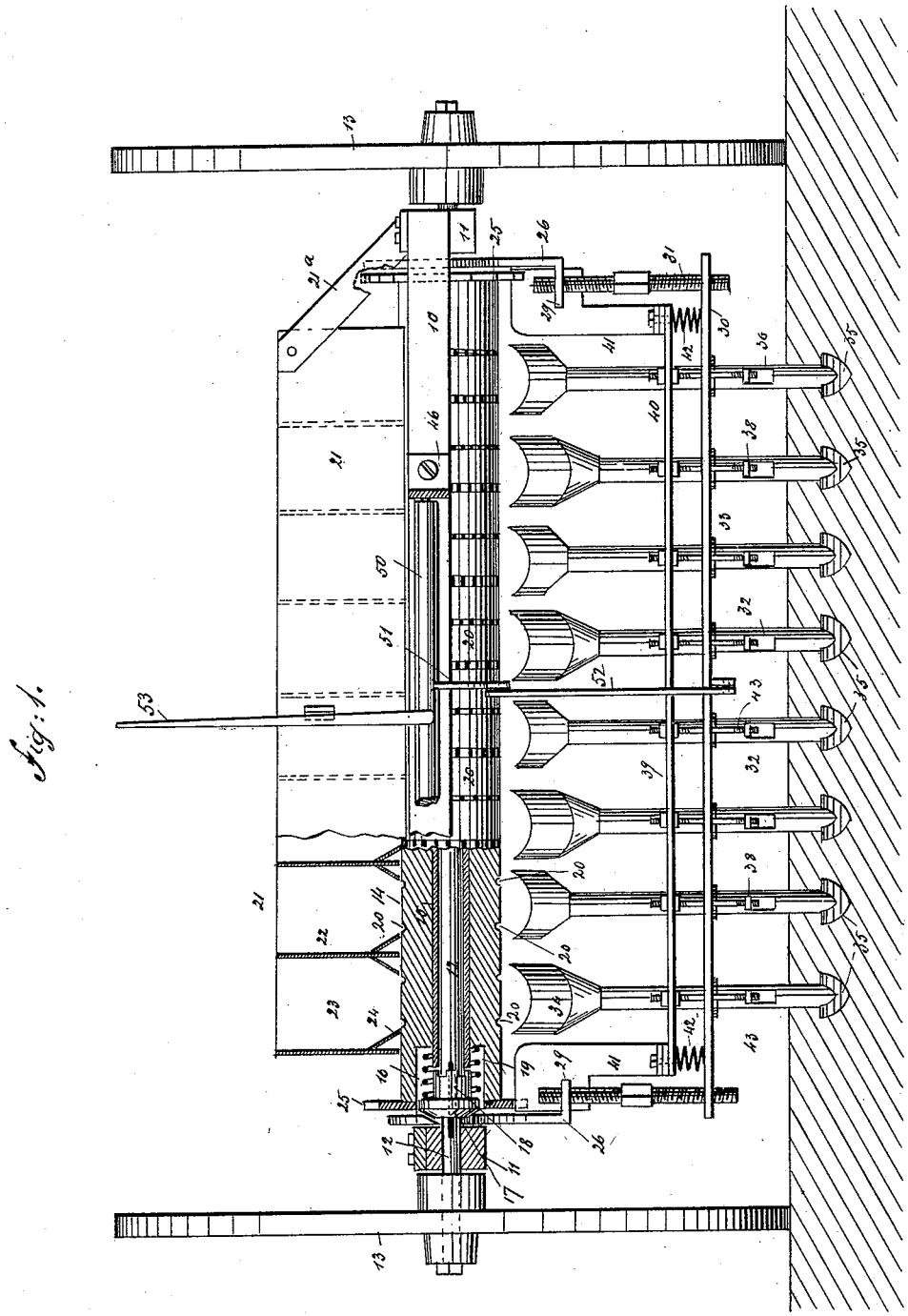
WITNESSES:
Chas. Nida
C. Sedgwick
INVENTOR:
C. J. Fendel
BY Munn & Co.
ATTORNEYS.

(No Model.) 3 Sheets—Sheet 2.
C. J. FENDEL.
GRAIN DRILL.
No. 401,022. Patented Apr. 9, 1889.
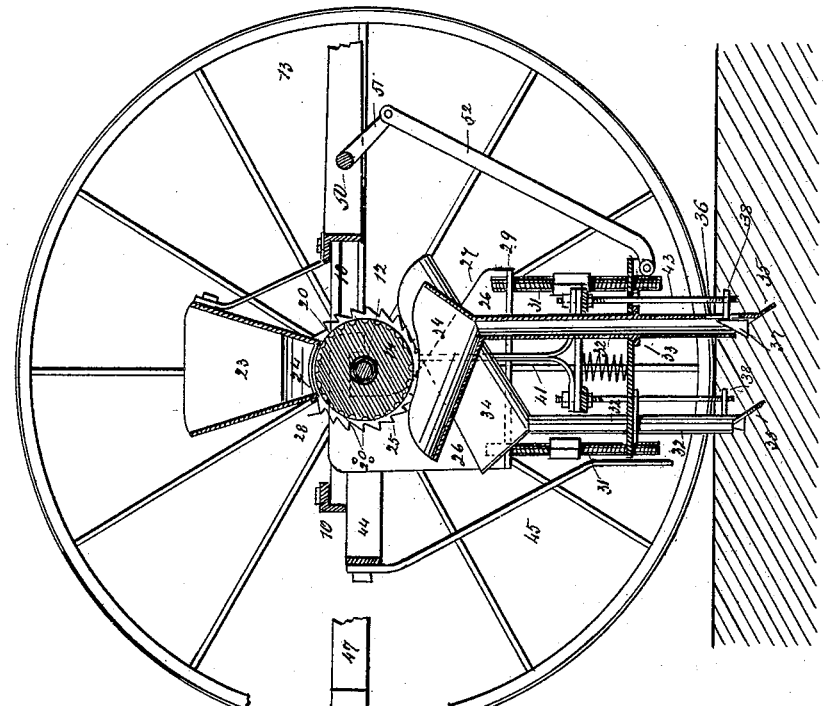
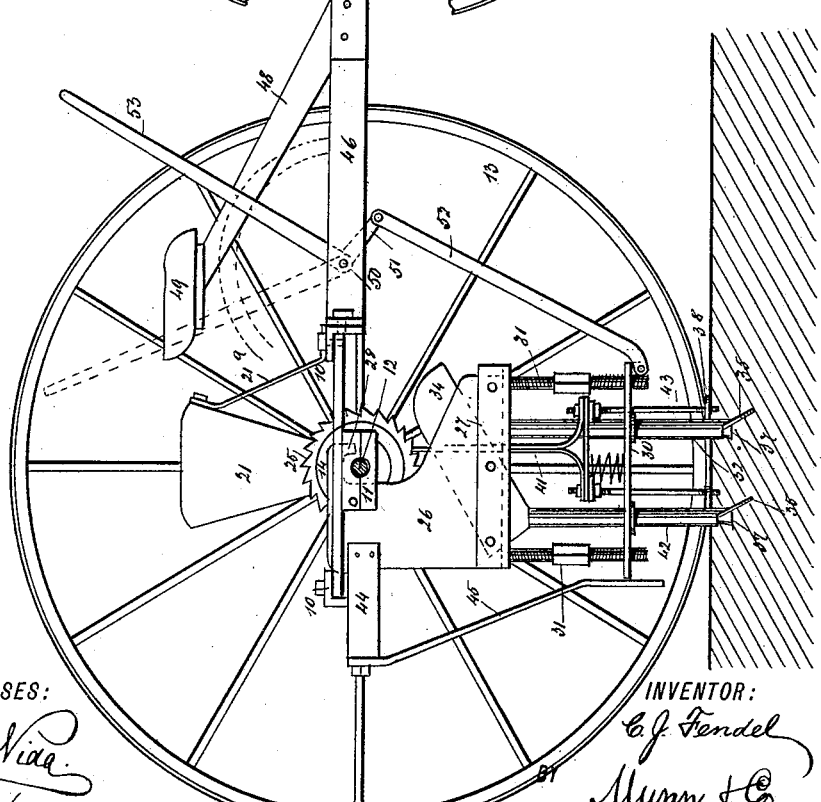
WITNESSES:
Chas. Nida
C. Sedgwick
INVENTOR:
C. J. Fendel
Munn & Co
ATTORNEYS.

(No Model.) 3 Sheets—Sheet 3.

C. J. FENDEL.
GRAIN DRILL.

No. 401,022. Patented Apr. 9, 1889.

WITNESSES:
Chas. Nias.
C. Sedgwick.

INVENTOR:
C. J. Fendel
BY
Munn & Co.
ATTORNEYS.

UNITED STATES PATENT OFFICE.

CHARLES JOSEPH FENDEL, OF BUTTE CITY, MONTANA TERRITORY.

GRAIN-DRILL.

SPECIFICATION forming part of Letters Patent No. 401,022, dated April 9, 1889.

Application filed July 31, 1888. Serial No. 281,543. (No model.)

*To all whom it may concern:*

Be it known that I, CHARLES JOSEPH FENDEL, of Butte City, in the county of Silver Bow and Territory of Montana, have invented a new and Improved Grain-Drill, of which the following is a full, clear, and exact description.

My invention relates to an improvement in grain-drills, and has for its object to provide an apparatus of simple and durable construction, wherein the grain may be dropped at regular distances or any distance required—for instance, at about four inches apart in both directions; and the further object of the invention is to provide an apparatus which will save in planting about two-thirds of the grain ordinarily wasted by the drills now in use, and wherein the method of planting by means of the said apparatus will greatly improve the yield in weight and quality, as each plant will have its allotted space, one not crowding or impairing the other.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 5:
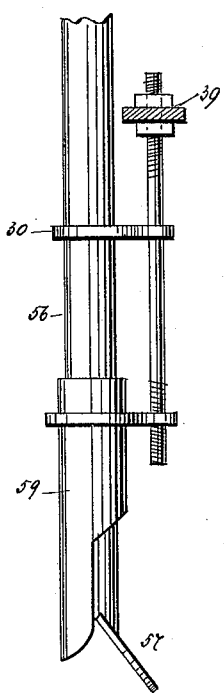
Figure 4:
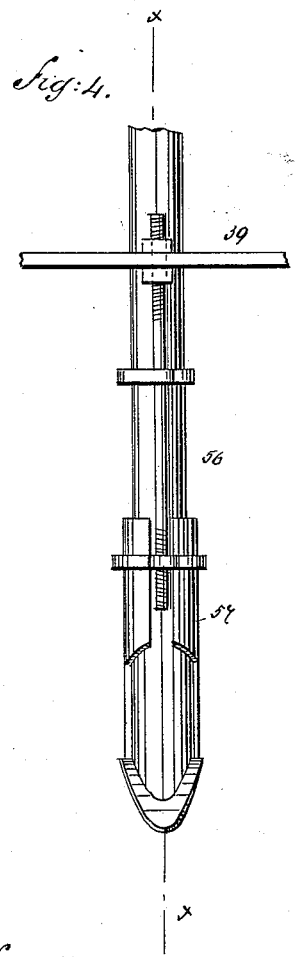
Figure 6:
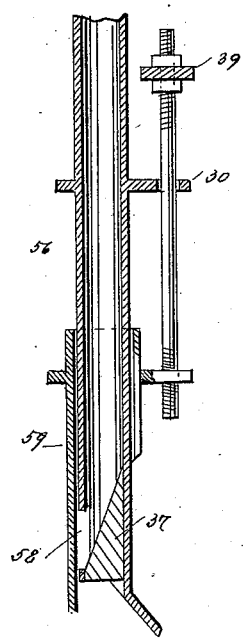
Figure 7:
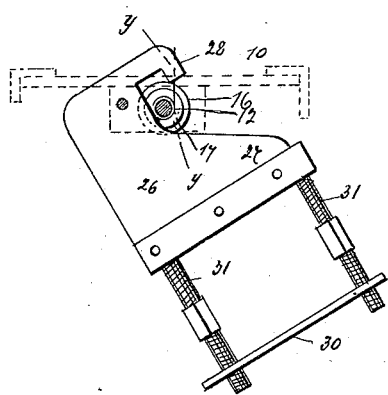
Figure 8:
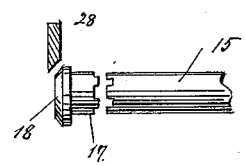

Figure 1 is a front elevation of the apparatus, partly in section. Fig. 2 is a side elevation of the same with one drive-wheel removed. Fig. 3 is a transverse vertical section. Fig. 4 is a front elevation of a modified form of drill used in connection with the apparatus. Fig. 5 is a side elevation of the same. Fig. 6 is a central vertical section on line $x$ $x$ of Fig. 4. Fig. 7 is a detail view illustrating the action of the swinging frame when elevated, and Fig. 8 is a section essentially on line $y$ $y$ of Fig. 7.

In carrying out the invention a rectangular frame, 10, is provided, ordinarily consisting of two metal end and side pieces bolted or otherwise secured together; but if in practice it is found desirable the said frame 10 may be cast in one piece.

Upon the under side of the end pieces of the frame 10, preferably at the center, a box, 11, is secured, and in said boxes the axle 12 is journaled, upon which axle, at the extremities outside of the frame 10, the drive-wheels 13 are rigidly secured. A drum or cylinder, 14, is held to turn upon the axle 12, within the frame 10, which drum or cylinder is provided with a longitudinal central bore and an interior sleeve, 15, rigidly secured to the walls of said bore, the said sleeve forming the bearing-surface of the cylinder or drum upon the axle.

The sleeve 15 extends essentially from one end of the cylinder to the other. At both ends of the said cylinder an interior recess, 16, is formed, and the sleeve 15 projects only partially within said recess, as best illustrated in Fig. 1. The extremities of the sleeve are toothed to form a rigid section of a clutch, 17, the movable or outer section of which clutch is splined upon the axle 12, having horizontal movement thereon, as best shown in Fig. 1, and the said movable section of the clutch is provided at the outer end with a head, 18, of less diameter than the diameter of the recess 16, and the outer face of the said head is beveled. The movable section 17 of the clutch is, when the apparatus is not in operation, held out of engagement with the fixed section through the medium of a spring, 19, encircling the two sections, having a bearing, respectively, against the inner wall of the recess 16 and the inner face of the head 18.

Upon the outer face of the cylinder or drum 14 a series of circumferentially-arranged pockets, 20, are produced. The diameter of the cylinder or drum is such as to contain fifty-four pockets in each of the series of the same, which pockets I, for convenience, denominate "seed-pockets," and the diameter of the drive-wheels is so calculated as to be about eight times the diameter of the drum or cylinder, whereby the seed is dropped about four inches apart; but the same may be varied in practice for different varieties of seed. Each pocket is so formed as to hold a single seed, and the distance between each set of pockets horizontally must be about two inches, making the distance between each alternate set of pockets four inches, which is also the space between the drills, as will be hereinafter set forth.

It is the purpose of the invention to provide a means whereby oats or wheat or barley, or, in fact, two or more different grains, may be sown or drilled by the same machine. To this end, for instance, each alternate set of pockets will be of a size adapted to receive a single grain of oats and the others to receive a single grain of barley or wheat.

The entire series of pockets are covered by a hopper, 21, supported above the drum or cylinder by suitable braces, 21ª, attached to the hopper and to the frame 10. The hopper 21 is divided into a series of chambers, 23, each chamber being adapted to embrace two series of pockets, as best illustrated in Fig. 1, namely—one set of pockets for oats and a second set of pockets for barley or wheat. The bottom of each chamber 23 is made to incline from the sides and front to the rear, as best illustrated at 24 in Fig. 1. The openings in the said bottom, which register with the pockets, may be made of sufficient size to permit of the egress of but a small quantity of grain.

If in practice it is found desirable, rollers may be made to intervene the hopper and the drum or cylinder at any convenient point, to lessen the friction of the former upon the latter. By this arrangement a farmer is enabled to do all his sowing with but one cylinder—as, for instance, if he intends to sow oats a false bottom is slipped between the hopper and cylinder over the wheat-groove and the opening in the hopper leading to said groove, thereby shutting off the supply to the same and admitting of a supply only to the oats or barley groove, and vice versa. At each end of the cylinder 14 a toothed wheel, 25, is rigidly attached, the teeth whereof correspond in number to the number of pockets in each set.

To the rear of the cylinder, at each end of the same between the cylinder and the frame 10, vertically-extending bracket-arms 26 are pivoted to the inner face of the boxes 11, as best shown in Figs. 1 and 7, the upper forward edge of which brackets is cut away and recessed to form the inclined surface 27 and the downwardly-projecting lip 28, the said lip 28 being adapted, when the apparatus is in operation, to engage the beveled surface of the clutch 17 and force the movable section of said clutch to a contact with the fixed section, thereby causing the cylinder to revolve with the drive-wheels and axle, and the lower end of the said brackets 26 is provided at the extremities with inwardly-projecting horizontal ears 29.

Below the cylinder 14 a horizontal platform, 30, is suspended through the medium of right and left threaded screws 31, passing through the said platform 30 at or near the corners and into the ears 29 of the bracket 26. In the platform 30 a series of alternately-arranged drills, 32, are supported, the said drills to that end being provided with collars 33, attached by screws or other equivalent devices to the under side of the platform or table 30, as best illustrated in Fig. 1.

By reason of the alternate grouping of the drills they are arranged in two rows, and each drill is provided at the upper end with a chute, 34, embracing two contiguous sets of seed-pockets. Thus one drill is provided for each chamber 23 of the hopper 21, and the chutes 34 of the drills are so located beneath the cylinder 14 as to effectually catch each seed as it is delivered from the pockets by the rotation of the cylinder.

It will be observed, also, that by the alternate grouping of the drills and the fact that each drill takes the seed from two contiguous sets of pockets, the seed delivered from the cylinder is deposited in two rows, and that when one pocket is shut off by the false bottom one row of seed will be planted from each drill.

The drills 32 consist of a tubular shell, which shell is secured to the table 30, and the outer extremity of the said shell is provided with an outwardly-flaring shovel, 35, which shovel entering the ground creates a furrow for the seed.

In the front of the shell, between the lower extremity and the table 30, a longitudinal slot, 36, is produced, and in the shell a block, 37, is held to reciprocate, the rear face of which block is made to have a taper from top to bottom, as illustrated in Fig. 3. The movement of the block 37, which controls the dropping of the seed, is regulated by the length of the slot 36, and to that end each block is provided with a lug, 38, attached thereto and extending outwardly through the slot 36, having an attachment to a second spring-actuated frame, in a manner hereinafter described. The shovels 35 are preferably made to partake of the shape of a double plow-shaft, and the blocks 37 not only control the dropping of the seed, but also prevent the openings in the shell from being clogged up with the soil they receive. It will thus be observed from the foregoing description that the lower suspended and pivoted frame is formed by the platform 30, the brackets 26, and the connecting and adjusting right and left screws 31.

An intermediate frame, 39, is provided, adapted to intervene the cylinder and the platform 30, which frame consists of a rectangular skeleton base, 40, of less width than the platform 30, and upwardly-extending vertical standards, 41, one standard being secured at each end of the skeleton frame. The upper ends of the standards are pivoted in projections formed upon the inner side of the brackets 26, and the said upper ends of the standards 41 are adapted to engage with the teeth of the cylinder-wheels 25, as also best illustrated in Fig. 1.

The frame 39 is made spring-actuated by a series of spiral springs, 42, socketed in the upper face of the platform 30, and having a bearing against the sides and ends of the skeleton base 40. Each of the several drill-blocks 37 is attached to the skeleton base 40 of the frame 39 through the medium of a right and left screw rod, 43, passing through the said base 40 and through the lugs 38 integral with the blocks. It will thus be seen that the two frames are free to swing upward, and that the said frames may be vertically adjusted as desired to suit the depth of planting.

The slots 36 in the shell of the drill are made longer than necessary for the movement of the blocks in order to permit the two frames to be swung upward without creating strain upon the drills. When the frames are swung upward, the brackets 26 assume the inclined position illustrated in Fig. 7, whereby the lip 28 is carried out of engagement with the outer clutch-section, permitting the spring 19 to act, which forces the movable section of the clutch outward upon the shaft, disengaging the same from the section secured to the cylinder, whereby the drive-wheels and the axle 12 may freely revolve without having any effect upon the said cylinder. The drill-carrying frames are thus elevated when the apparatus is driven to or from the field, or when the planting has been accomplished. In order to brace the swinging frames laterally, a rearwardly-extending and horizontal arm, 44, is attached to the rear of the several brackets 26, and from said arms 44 brace-rods 45 are downwardly projected, the same being carried at an inclination forward to a point to the rear and above the platform 30, and then vertically downward to a contact with the rear side of said platform, as best illustrated in Figs. 2 and 3.

To the front of the frame 10, at each side of the center, arms 46 are secured, which arms are projected forward and inward to receive the draft-beam 47. From the draft-beam 47, preferably at the intersection with the arms 46, the seat-support 48 is secured, which seat-support, carrying the seat 49, is extended rearwardly in direction of the cylinder.

A rock-shaft, 50, is journaled in the arms 46, parallel with the side of the frame 10, which rock-shaft is connected with the platform 30 at or about the center, by a rod, 51, secured to said rock-shaft and extending forwardly at right angles thereto, and a pitman or connecting-rod, 52, as best illustrated in Figs. 1, 2, and 3.

The shaft 50 is actuated through the medium of a lever, 53, secured thereto, which lever extends upward adjacent to the driver's seat. The lever 53 may be made to travel in a segmental rack; or other equivalent device may be employed to retain the lever in any desired position. When the lever 53 is carried to the rear, the frames in which the drill and drill-actuating mechanism are secured are inclined upward and forward at an elevation from the ground, and the same movement of the frame, as aforesaid, causes an inclination of the bracket 26, forming a portion of said frame, whereby the clutch 17 is disengaged and the cylinder thrown out of engagement with the axle. When the parts are in this position, the apparatus may be driven to or from the field. To bring the parts in position for work, the lever is carried downward, bringing the frame to a horizontal position.

Instead of the drill illustrated in Figs. 1, 2, and 3, the drill shown in Figs. 4, 5, and 6 may be substituted. This drill is composed of a shell, 56, adapted to be attached rigidly to the apparatus, the shell having integral with the lower end a shovel, 57, and upon the side opposite to that containing the shovel and near the bottom a longitudinal aperture, 58, is produced, and the block 37 is rigidly secured in the shell adjacent to the aperture, the face of the block facing the aperture being inclined from the top to the bottom, as illustrated in Fig. 6. The block 37 completely closes the lower end of the shell. The grain is permitted to escape by reason of a sleeve, 59, reciprocating upon the shell, which sleeve, when elevated, exposes the aperture 58, allowing the seed to fall, and when the said sleeve is lowered the said aperture 58 is closed.

Having thus described my invention, what I claim as new, and desire to secure by Letters Patent, is—

1. In a grain-drill, the combination, with a cylinder provided with a fixed number of circumferentially-grouped pockets arranged a set distance apart, and a sleeve passing longitudinally through said cylinder having teeth produced in the extremities, of an axle passing through said sleeve, a spring-actuated clutch-section splined upon said axle engaging the toothed surface of the sleeve, drive-wheels secured to the axle of as many times greater diameter than said cylinder as the desired distance between the seed when dropped is times greater than the distance between the pockets, brackets pivoted to the bearings of the said axle engaging the movable clutch-section, and drills supported from said brackets beneath the several groups of pockets, substantially as shown and described.

2. In a grain-drill, the combination, with a cylinder provided with a number of circumferentially-grouped pockets arranged a set distance apart, a sleeve longitudinally fitted in said cylinder having toothed extremities, a hopper supported above the cylinder, partitions dividing said hopper into a series of chambers, embracing two of said groups of pockets, said chambers having inclined bottoms, and toothed wheels secured to the extremities of said cylinder, of an axle passing through the sleeve of the cylinder, a spring-actuated clutch splined upon said axle, brackets journaled in the bearings of the axle, a lip engaging said clutch, a platform adjustably suspended from said brackets, drills alternately secured in said platform, and a spring-actuated frame engaging the toothed wheels of the cylinder and adjustably attached to the dropping mechanism of the drill, substantially as shown and described.

3. In a grain-drill, the combination, with a cylinder provided with a number of circumferentially-grouped pockets arranged a set distance apart, a sleeve longitudinally fitted in said cylinder having toothed extremities, a hopper supported above the cylinder, partitions dividing said hopper into a series of chambers embracing two of said groups of pockets, said chambers having inclined bottoms, and toothed wheels secured to the extremities of said cylinder, of an axle passing through the sleeve of the cylinder, a spring-actuated clutch-section splined upon said axle, brackets journaled in the bearings of the axle having a lip engaging said clutch, a platform adjustably suspended from said brackets, drills alternately secured in said platform, a spring-actuated frame engaging the toothed wheels of the cylinder and adjustably attached to the dropping mechanism of the drill, a frame supported upon the axle surrounding the cylinder, arms projected from said frame, a rock-shaft journaled in said arms, a connection between said rock-shaft and drill-carrying frame, and a lever projected from said rock-shaft, substantially as shown and described, whereby the drill-carrying frame may be elevated or depressed, as desired.

CHARLES JOSEPH FENDEL.

Witnesses:
GEORGE JORGENSEN,
ADERON JASPER MCWILLIAMS.